Patented May 28, 1929.

1,714,783

UNITED STATES PATENT OFFICE.

WILLY O. HERRMANN AND HANS DEUTSCH, OF MUNICH, GERMANY, ASSIGNORS TO CONSORTIUM FUR ELEKTROCHEMISCHE INDUSTRIE, OF MUNICH, GERMANY.

PROCESS FOR THE MANUFACTURE OF ACETALDEHYDE.

No Drawing. Application filed April 3, 1928, Serial No. 267,129, and in Germany April 4, 1927.

We have found that vinyl esters may be easily transformed to acetaldehyde and acid by reaction with water.

This reaction is especially smoothly running if acid catalysts are employed. Especially active catalysts are acids such as phosphoric and sulfuric acid or acid salts like primary sodium phosphate, sodium bisulfate, benzenesulfonic acid, sulfoacetic acid. The acetaldehyde formed is advantageously removed according to its formation in order to hinder its transformation for instance to resin by the action of the catalysts.

We have further found that the decomposition of the vinylic esters by water or watery liquids runs in a considerably uniform and rapid manner if it is carried out in the presence of a dissolving or emulsifying means. The reaction is promoted by such small quantities of a dissolving or emulsifying means which cause the homogenization only at the boiling point of the mixture. Such additional solvents or emulsifying means are organic solvents for the vinyl ester, especially the corresponding organic acid, contained in the vinylic esters. Of course the carboxylic acids may be used in a large excess.

When decomposing the vinylic esters in the presence of catalysts it may occur that part of the vinylic esters by addition of carboxylic acid is transformed to the corresponding ethylideneester which easily resinifies. This formation of ethylideneester and the resulting resinification may be hindered by carrying out the decomposition of the vinylic esters in the presence of more than the theoretical quantity of water We have further found that the velocity of the decomposition within large limits is independent of the concentration of the vinylic ester in the catalyst containing reaction mixture. Thus it is allowed continuously to keep the concentration of the vinylic ester low in order to hinder secondary reactions, the speed of the decomposition being nevertheless satisfying.

The reaction runs in an especially advantageous manner by a continuous addition of the vinylic ester according to the volatilizing of acetaldehyde The acid formed by the decomposition may be removed from the reaction vessel in a continuous or intermittent manner. Of course the reacting apparatus may be constructed in the form of a continuously acting fractionating column, reaction tower or the like in order to make the production of aldehyde and acid a continuous one. For instance the vinylic ester and the corresponding quantities of water and catalyst and if desired of a solvent are continuously fed into the fractionating column of a still. The heating of the still, cooling of the dephlegmator and speed of feeding are so regulated that aldehyde is continuously distilling off and the acid running down.

Example I.

A vessel provided with a fractionating column is charged with a mixture of 200 parts of vinylic acetate, 200 parts of acetic acid, 61 parts of water and 40 parts of phosphoric acid. This reaction mixture is heated to the boiling point. 97 parts of aldehyde are obtained. The acetic acid formed is contained in the remaining reaction liquid. A small amount of ethylidenediacetate and of resin are formed. The acetic acid is distilled off and the remaining phosphoric acid used again.

Example II.

Corresponding to Example I a mixture of 200 parts of vinyl acetate, 200 parts of acetic acid, 244 parts of water and 12 parts of phosphoric acid are decomposed by heating. 101 parts of aldehyde are obtained. Only a very small quantity of resin and ethylidenediacetate are formed. The acetic acid is distilled off and the remaining phosphoric acid used again.

Example III.

A mixture of 200 parts of vinylic acetate, 200 parts of acetic acid, 336 parts of water and 8 parts of sulfuric acid are decomposed according to Example I by heating. After the major part of the corresponding aldehyde is distilled off a further lot of 200 parts of vinylic acetate is fed into the reaction vessel and after the distillation of the further formed aldehyde a third lot of 200 parts of vinylic acetate. By this manner 305 parts of aldehyde are obtained corresponding to a yield of 99%. The resinification was below that of Example II.

The feed and the decomposition of vinyl acetate may be carried out in a continuous way. In an analogous manner other vinylic esters such as vinylic propionate, vinylic butyrate and the like may be decomposed.

*Example IV.*

A vessel provided with a fractionating column is charged with a boiling mixture of 100 parts of acetic acid, 150 parts of water and 4 parts of sulfuric acid. Into this boiling mixture vinylic acetate with the quantity of water necessary for the decomposition is allowed to flow. The speed of feeding is regulated by the speed of volatilization of aldehyde. After 1000 parts of vinylic acetate are added, the feed is stopped in order to remove half of the content of the vessel. 75 parts of water and 2 parts of sulfuric acid are added and a further quantity of 500 parts of vinylic acetate are allowed to flow in. This method of working and interrupting is repeated as often as desired.

In this way 50 to 60 parts of aldehyde per hour are obtained with a yield of about 100%. Resinification is of no importance. The acetic acid formed is obtained by distillation of the reaction liquid also with a nearly theoretical yield. The remaining sulfuric acid may be used again.

What we claim is:

1. Process for the manufacture of aldehyde by heating vinylic esters and water in the presence of acid catalysts.

2. Process for the manufacture of aldehyde by heating vinylic esters and water in the presence of mineral acid.

3. Process for the manufacture of aldehyde by heating vinylic esters with an excess of water in the presence of mineral acid.

4. Process for the manufacture of aldehyde by heating vinylic esters and water in the presence of mineral acid adding substances of dispersing action.

5. Process for the manufacture of aldehyde by heating vinylic esters with an excess of water in the presence of mineral acid adding substances which cause the dissolution of water in the vinylic ester.

6. Process for the manufacture of aldehyde by heating vinylic esters with an excess of water in the presence of mineral acid adding a carboxylic acid corresponding to that of the vinylic ester.

7. Process for the manufacture of aldehyde by heating vinylic esters with an excess of water in the presence of mineral acid adding a carboxylic acid corresponding to that of the vinylic ester and gradually adding the vinylic ester according to the distilling off of aldehyde formed.

8. Process for the manufacture of aldehyde by heating vinylic acetate with an excess of water in the presence of sulfuric acid, adding acetic acid, and gradually adding vinylic acetate according to the distilling off of aldehyde formed.

9. Process for the manufacture of aldehyde by heating vinylic ester with an excess of water in the presence of mineral acid and solvents for the vinylic ester.

10. Process for the manufacture of aldehyde by heating vinylic ester with an excess of water in the presence of mineral acid and solvents for the vinylic ester, feeding the reaction mixture in a continuous manner into the fractionating column of a still and continuously removing the aldehyde and the carboxylic acid formed.

11. Process for the manufacture of aldehyde by heating vinylic acetate with an excess of water in the presence of sulfuric and acetic acid, feeding the reaction mixture in a continuous manner into the fractionating column of a still and continuously removing the aldehyde and the carboxylic acid formed.

WILLY O. HERRMANN.
HANS DEUTSCH.